United States Patent
Yeon et al.

(10) Patent No.: US 9,014,324 B2
(45) Date of Patent: Apr. 21, 2015

(54) COOLANT WITH DISPERSED NEUTRON POISON MICRO-PARTICLES, USED IN SCWR EMERGENCY CORE COOLING SYSTEM

(75) Inventors: Jei-Won Yeon, Daejeon (KR); Kyuseok Song, Daejeon (KR); Yoon-Yeong Bae, Daejeon (KR); Jong-Yun Kim, Daejeon (KR); Jinsung Jang, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 1102 days.

(21) Appl. No.: 12/559,220

(22) Filed: Sep. 14, 2009

(65) Prior Publication Data

US 2010/0239062 A1    Sep. 23, 2010

(30) Foreign Application Priority Data

Mar. 19, 2009 (KR) .................. 10-2009-0023557

(51) Int. Cl.
*G21C 9/00* (2006.01)
*G21C 9/033* (2006.01)
*G21C 15/18* (2006.01)
*G21C 15/28* (2006.01)

(52) U.S. Cl.
CPC ............... *G21C 9/033* (2013.01); *G21C 15/18* (2013.01); *G21C 15/28* (2013.01); *Y02E 30/40* (2013.01)

(58) Field of Classification Search
CPC ............ G21D 3/04; G21D 3/06; G21C 9/00; G21C 9/02; G21C 15/18; G21C 15/182; G21C 2015/00; G21C 2015/182; G21C 2015/185; G21C 2015/187
USPC .................. 376/207, 210, 277, 282
See application file for complete search history.

(56) References Cited

U.S. PATENT DOCUMENTS

| 3,819,476 A | * | 6/1974 | Pocock et al. ............... 376/306 |
| 5,377,242 A | | 12/1994 | Carlton et al. |
| 2003/0012328 A1 | | 1/2003 | Kataoka et al. |

FOREIGN PATENT DOCUMENTS

| JP | 2008-266126 | * 11/2008 | ............. C01B 31/36 |
| JP | 2008-266126 A | 11/2008 | |
| KR | 10-0402750 B1 | 10/2003 | |

\* cited by examiner

*Primary Examiner* — Jack W Keith
*Assistant Examiner* — Marshall O'Connor
(74) *Attorney, Agent, or Firm* — Lucas & Mercanti, LLP

(57) ABSTRACT

Disclosed is a coolant with dispersed neutron poison micro-particles, used in a supercritical water-cooled reactor (SCWR) emergency core cooling system. Since the neutron poison micro-particles are uniformly dispersed in the coolant of the emergency core cooling system for a long period time, their fluidity is not lowered even though the polarity of water is changed in a supercritical state. Therefore, the neutron poison micro-particles absorb neutrons produced from nuclear fission in a nuclear reactor core. Accordingly, the neutron poison micro-particles can be appropriately used as a means for controlling neutrons and stopping a nuclear reactor in the SCWR emergency core cooling system.

17 Claims, 4 Drawing Sheets

COOLANT WITH DISPERSED NEUTRON POISON MICRO-PARTICLES, USED IN SCWR EMERGENCY CORE COOLING SYSTEM

CROSS-REFERENCES TO RELATED APPLICATION

This patent application claims the benefit of priority under 35 U.S.C. §119 of Korean Patent Application No. 10-2009-23557 filed on Mar. 19, 2009, the contents of which are incorporated herein by reference.

BACKGROUND OF THE INVENTION

1. Field of the Invention

The present invention relates to the coolant with dispersed neutron poison micro-particles, used in an SCWR emergency core cooling system.

2. Description of the Related Art

Generally, in nuclear power generation, thermal energy is generated by the chain fission of a fissionable material such as thorium, uranium, plutonium or the like, and power necessary for electric power generation is derived from the thermal energy. At this time, the fissionable material is prepared in the form of a sintered body and contained in a nuclear fuel rod. Nuclear fuel rods are arranged in a bundle to form a nuclear fuel assembly. In a nuclear reactor, a control rod and a moderator are generally used to prevent a chain reaction (reactivity: >1) of fissionable materials. The number and speed of extra neutrons can be appropriately controlled by a control rod, a moderator/coolant and the like, and accordingly, energy generated from nuclear fission reactions is used for electric generation. The moderator generally includes heavy water ($D_2O$), light water ($H_2O$), graphite, beryllium and the like. Depending on the moderator/coolant, nuclear reactors may be classified into a light-water type nuclear reactor (LWR: PWR, BWR), a heavy-water type nuclear reactor (HWR), a high-temperature gas-cooled reactor (HTGR), and the like.

For example, in a light-water reactor, ordinary water (light water) is used as the moderator and coolant of a nuclear reactor. The basic operating principle of the light-water reactor is that steam is generated by heating water using nuclear reactions in the nuclear reactor, and electric power is generated using the steam. Therefore, the light-water reactor requires a nuclear reactor, a steam generator, a recirculation pump, a turbine, a condenser and the like, used in a nuclear power generation system.

However, up to the present, nuclear power has had not only its convenience but also its problems such as the risk of radiation accident and the treatment of radioactive waste. Therefore, requirements for fourth-generation nuclear reactor (GEN IV) have been increased to solve such problems. In relation to the GEN IV, theoretical interests on a supercritical water-cooled reactor (SCWR) have been increased.

The SCWR is a system for generating high-temperature water (350 to 500° C.) by pressurizing core cooling water to above the critical pressure of water and heating the core cooling water in a core. Since the SCWR forms a pressure greater than a critical pressure of 22.1 MPa in a nuclear reactor and generates supercritical water that is a fluid at a high temperature of about 375° C. or more, the steam generator and recirculation pump used in the conventional light-water reactor are unnecessary. Accordingly, a nuclear power generation system can be simply manufactured. Furthermore, since the supercritical water has a high temperature, generation efficiency can be increased up to about 44%. Accordingly, the SCWR has more improved characteristics than an improved thermal power plant.

The operating temperature of a coolant in the SCWR is generally in the range of about 280 to 550° C. In this case, the pressure is higher than 22.1 MPa that is the critical pressure of water. Under conditions of such a nuclear reactor core, the density of water is greatly changed in the range of about 0.1 to 0.7 g/cc or less. Therefore, the density of water has a much lower value than that in a conventional pressurized or boiling water reactor. The reason why the density of water is lowered in a supercritical state is that hydrogen bonding formed between water molecules is broken. At this time, the basic chemical property of water is changed from polar to non-polar such as that of organic oil.

Such a supercritical water state generally has two problems. A first problem is moderation of neutrons due to the decrease in density of water for changing fast neutrons to thermal neutrons. A second problem is a low solubility of boric acid used as a neutron poison micro-particles. The problem of neutron moderation can be solved by adding a water rod in a non-critical state into the core or by using a solid moderator such as zirconium hydride. However, an appropriate method of substituting for soluble neutron poison materials has not been developed yet.

Since safety is more important than economical efficiency in nuclear power plants, strict regulations related to safety are applied in all processes of design, construction, operation and destruction of the nuclear power plants. A nuclear reactor has intrinsic safety governed by the natural laws, and a linkage system is provided to automatically control the nuclear reactor not to be operated out of a predetermined safety range. If the nuclear reactor is operated out of the safety margin, it is designed to stop immediately.

To stop a nuclear reactor, control rods formed of the solid neutron poison materials is generally inserted into a core. However, an emergency core cooling system is provided to the nuclear reactor for the case where the control rods are not operated. The emergency core cooling system functions to stop operations of the nuclear reactor and to prevent an increase in temperature of the nuclear reactor.

Specifically, the emergency core cooling system shown in FIG. 1 comprises an accumulation tank 3 for automatically injecting the coolant containing neutron poison micro-particles into a nuclear reactor 2 when the pressure in the nuclear reactor 2 is lower than a predetermined pressure; a refueling water storage tank 1 in which the neutron poison micro-particles are contained; and a high-pressure injection pump 7 for re-injecting refueling water and the water gathered in a drainage tank at the bottom of a nuclear reactor building. The neutron poison micro-particles contained in the water are injected into the nuclear reactor through the emergency core cooling system, so that nuclear fission reaction is stopped.

At this time, boric acid solution has been used as cooling water containing neutron poison micro-particles in the conventional light-water or boiling nuclear reactor.

Generally, boric acid as soluble neutron poison material used in a nuclear reactor is well dissolved in a polar solvent. Therefore, the boric acid is well dissolved in water with a non-critical state of 374° C. or lower but is not easily dissolved in water with a supercritical state higher than the non-critical state. If boric acid solution is used in the SCWR, the dissolved boric acid can be extracted by a solubility difference when the boric acid solution is changed into the supercritical state. Such a phenomenon is well known in a salt solution such as salt water. If the dissolved boric acid is extracted when the boric acid solution is changed into the supercritical state, functions for the control and stop of the nuclear reactor using cooling water may be limited. Therefore, there is required a new coolant used in a SCWR emergency core cooling system.

Accordingly, while studying a method of uniformly dispersing neutron poison materials in cooling water even though the polarity of water is changed, the present inventors have developed a coolant for a SCWR, with uniformly dispersed neutron poison micro-particles. Based on these findings, the present invention was completed.

SUMMARY OF THE INVENTION

The present invention is conceived to solve the aforementioned problems. Accordingly, it is an object of the present invention to provide a coolant with dispersed neutron poison micro-particles, which can be flowed in a particle state regardless of the polarity of water.

To achieve these objects of the present invention, there is provided a coolant with dispersed neutron poison micro-particles having an average diameter of 7 μm or less, used in a supercritical water-cooled reactor (SCWR) emergency core cooling system.

BRIEF DESCRIPTION OF THE MARK OF DRAWINGS

Figure 1:
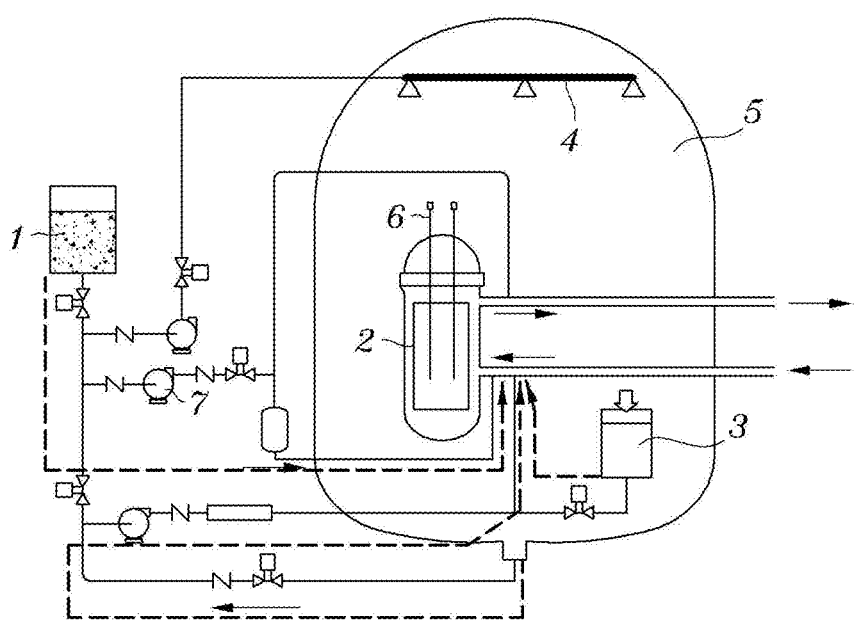
FIG. 1 is a schematic view of an emergency core cooling system of a nuclear reactor.

1: Refueling water storage tank
2: Nuclear reactor
3: Accumulation tank
4: Spray system
5: Reactor containment vessel
6: Control rods
7: High-pressure injection pump
→: Coolant flow way of the emergency core cooling system

DESCRIPTION OF THE PREFERRED EMBODIMENTS

Hereinafter, exemplary embodiments of the present invention will be described in detail.

The present invention provides a coolant with dispersed neutron poison micro-particles, used in supercritical water-cooled reactor (SCWR) emergency core cooling system.

In the present invention, the neutron poison micro-particles function to absorb the neutrons produced from nuclear fission in a nuclear reactor core.

The neutron poison micro-particle may be a material including one or more selected from the group consisting of boron (B), gadolinium (Gd), silver (Ag) and cadmium (Cd).

Preferably, the neutron poison micro-particle is boron or gadolinium carbide, boron or gadolinium oxide, boron or gadolinium nitride, or metal boride. More preferably, the neutron poison micro-particle is selected from the group consisting of $B_4C$, $B_2O_3$, BN, $Gd_2O_3$, $GdC_2$, GdN and $TiB_2$.

Preferably, the neutron poison micro-particles have an average diameter of 7 μm or less. More preferably, the neutron poison micro-particles have an average diameter of 10 nm to 1 μm. When the average diameter of the neutron poison micro-particles is in the aforementioned range, the neutron poison micro-particles may be uniformly dispersed in water and may be stably dispersed even after 15 hours. Furthermore, the neutron poison micro-particles may be dispersed up to maximum 3,500 ppm at a normal temperature based on the concentration of B (see FIG. 2).

When the neutron poison micro-particle contains boron, the isotope content of B-10 in the boron is may be 19.9% or more. When the neutron poison micro-particle contains gadolinium, the isotope content of Gd-157 in the gadolinium is may be 16.65% or more. The operations of most nuclear reactors may be stopped by the aforementioned concentration.

Since the neutron poison micro-particles are flowed in a particle state regardless of the polarity of water, their fluidity is not lowered even though the polarity of water is changed in a supercritical state. Therefore, the neutron poison micro-particles can absorb extra neutrons produced from nuclear fission in the nuclear reactor core. Accordingly, the neutron poison micro-particles can be appropriately used as a means for controlling neutrons and stopping a nuclear reactor in the SCWR emergency core cooling system.

Hereinafter, the present invention will be described in more detail with reference to the following Examples. However, the following Examples are provided only for illustrative purposes and for full understanding of the present invention, and the scope of the present invention is not limited thereto.

Example

An SCWR emergency core cooling system was provided as shown in FIG. 1. The coolant with dispersed $B_4C$ particles of 1 μm or less was contained in a cooling water storage container and then circulated in the container of the emergency core cooling system. Here, the $B_4C$ particles were dispersed at a concentration of 3,500 ppm based on boron.

Experimental Example

Dispersion Experiment of Neutron Poison Micro-Particles

First, the following experiment was performed to develop the coolant with dispersed neutron poison micro-particles, used in the SCWR emergency core cooling system.

Three kinds of $B_4C$ particles respectively having average diameters of 7 μm or less, 8 to 10 μm and 20 to 60 μm were dispersed in distilled water, and the Tyndall phenomenon of the $B_4C$ particles was then observed using a He—Ne laser so as to examine uniform dispersions of the $B_4C$ particles. Subsequently, only the particles which were not precipitated on the bottom of the container but stably dispersed were separated using a micro-filter. Then, the maximum dispersion amount was measured by measuring weights of the separated particles (based on the concentration of B).

The measured results were shown in the following Table 1.

TABLE 1

| Average diameter of $B_4C$ particles (μm) | Tyndall phenomenon | Maximum dispersion amount (ppm, B) |
|---|---|---|
| 7 or less | Active | 3,500 |
| 8~10 | Non-active | 10 or less |
| 20~60 | Non-active | — |

As shown in Table 1, when the average diameter of the $B_4C$ particles is 7 μm or less, the $B_4C$ particles can be uniformly dispersed up to maximum 3,500 ppm.

Next, the following experiment was performed to examine whether or not $B_4C$ particles are stably dispersed.

Five solutions with same dispersed $B_4C$ particles were prepared. Here, the $B_4C$ particles have the average diameters of 7 μm or less. Subsequently, only the particles which were not precipitated on the bottom of the container but stably dispersed after 1, 2, 5, 14 and 25 hours were separated using a micro-filter. Then, dispersion ratios were measured by measuring weights of the separated particles. The measured dispersion ratios were shown as a function of time in FIG. 2.

Figure 2:
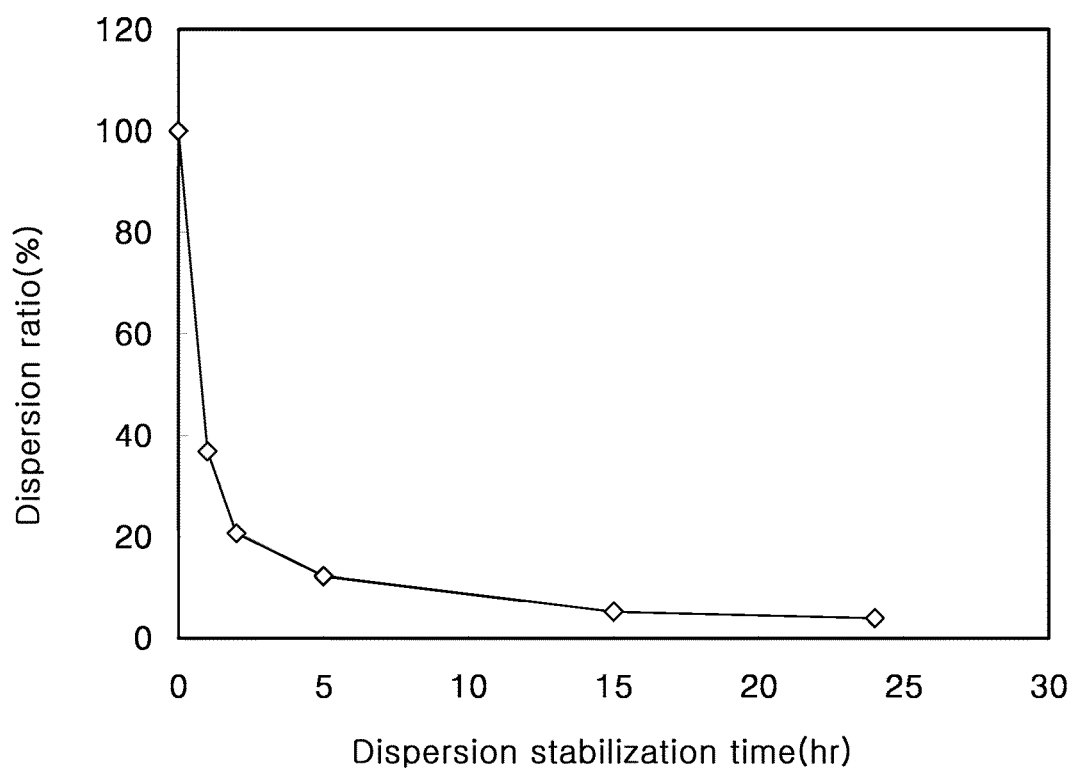
FIG. 2 is a graph showing dispersion ratios of $B_4C$ dispersed based on times in distilled water according to an embodiment of the present invention.

As shown in FIG. 2, it can be seen that large particles are continuously precipitated until 15 hours, but the dispersion ratios of the $B_4C$ particles is maintained almost constant after 15 hours.

The size of the particles stably dispersed after 15 hours was observed using a scanning electron microscope (SEM). The result was shown in FIGS. 3 and 4.

Figure 3:
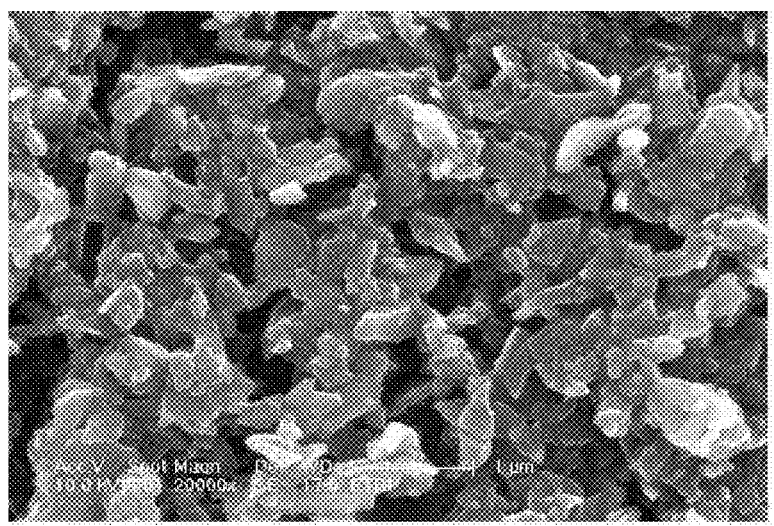
FIG. 3 is a scanning electron microscopic (SEM) photograph of $B_4C$ particles stably dispersed in the distilled water according to the embodiment of the present invention.
Figure 4:
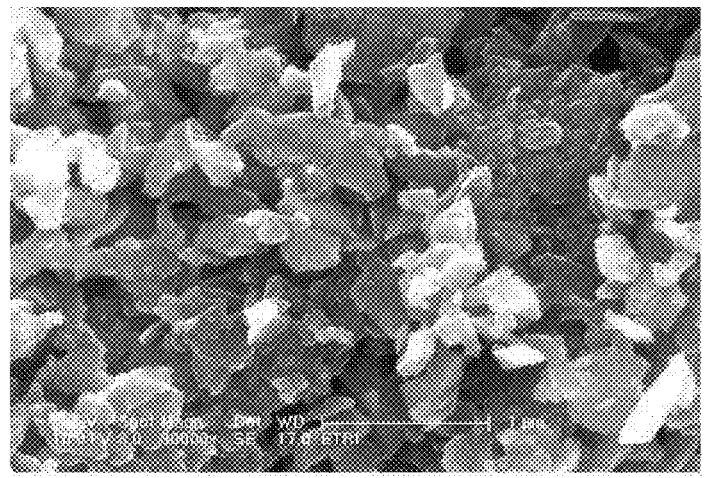
FIG. 4 is an enlarged SEM photograph of the $B_4C$ particles stably dispersed in the distilled water according to the embodiment of the present invention.

As shown in FIGS. 3 and 4, it was observed that the average diameter of the particles stably dispersed in the solution was 1 μm or less.

Accordingly, it can be seen that, when $B_4C$ particles with an average diameter of 1 μm or less are dispersed up to 3,500 ppm based on the concentration of B, the dispersion state of the particles is stably maintained without external convection energy. When the $B_4C$ particles are used as an additive of the coolant for the SCWR emergency core cooling system, their fluidity is not lowered even though the polarity of water is changed in a supercritical state. Accordingly, the $B_4C$ particles can be appropriately used as a means for controlling neutrons and stopping a nuclear reactor.

According to the present invention, since the neutron poison micro-particles are uniformly dispersed in the coolant of the SCWR emergency core cooling system for a long period time, their fluidity is not lowered even though the polarity of water is changed in a supercritical state. Therefore, the neutron poison micro-particles absorb extra neutrons produced from nuclear fission in a nuclear reactor core. Accordingly, the neutron poison micro-particles can be appropriately used as a means for controlling neutrons and stopping a nuclear reactor in the SCWR emergency core cooling system.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

What is claimed is:

1. A nuclear power generation system comprising:
   a supercritical water-cooled reactor (SCWR) containing a cooling water in supercritical state; and
   an emergency core cooling system of a supercritical water-cooled reactor (SCWR),
   wherein the emergency core cooling system of a supercritical water-cooled reactor (SCWR) comprising:
   an accumulation tank;
   a coolant containing neutron poison micro-particles uniformly dispersed in water which is automatically injected by the accumulation tank and wherein the water is in supercritical state while the emergency core cooling system is operated;
   a refueling water storage tank in which neutron poison micro-particles are contained; and
   a high-pressure injection pump for re-injecting refueling water and the water gathered in a drainage tank at the bottom of a nuclear reactor building,
   wherein the neutron poison micro-particles have an average diameter of 7 μm or less.

2. The nuclear power generation system as set forth in claim 1, wherein the neutron poison micro-particle is a material including one or more selected from the group consisting of boron (B), gadolinium (Gd), argentums (Ag) and cadmium (Cd).

3. The nuclear power generation system as set forth in claim 1, wherein the neutron poison micro-particle is boron carbide or gadolinium carbide.

4. The nuclear power generation system as set forth in claim 1, wherein the neutron poison micro-particle is boron oxide or gadolinium oxide.

5. The nuclear power generation system as set forth in claim 1, wherein the neutron poison micro-particle is boron nitride or gadolinium nitride.

6. The nuclear power generation system as set forth in claim 1, wherein the neutron poison micro-particle is metal boride.

7. The nuclear power generation system as set forth in claim 2, wherein the boron comprises an isotope content of 19.9% or more of $^{10}B$.

8. The nuclear power generation system as set forth in claim 3, wherein the boron carbide comprises boron with an isotope content of 19.9% or more of $^{10}B$.

9. The nuclear power generation system as set forth in claim 4, wherein the boron oxide comprises boron with an isotope content of 19.9% or more of $^{10}B$.

10. The nuclear power generation system as set forth in claim 5, wherein the boron nitride comprises boron with an isotope content of 19.9% or more of $^{10}B$.

11. The nuclear power generation system as set forth in claim 6, wherein the metal boride comprises boron with an isotope content of 19.9% or more of $^{10}B$.

12. The nuclear power generation system as set forth in claim 2, wherein the gadolinium comprises an isotope content of 16.65% or more of $^{157}Gd$.

13. The nuclear power generation system as set forth in claim 3, wherein the gadolinium carbide comprises gadolinium with an isotope content of 16.65% or more of $^{157}Gd$.

14. The nuclear power generation system as set forth in claim 4, wherein the gadolinium oxide comprises gadolinium with an isotope content of 16.65% or more of $^{157}Gd$.

15. The nuclear power generation system as set forth in claim 5, wherein the gadolinium nitride comprises gadolinium with an isotope content of 16.65% or more of $^{157}Gd$.

16. The nuclear power generation system as set forth in claim 1, wherein the neutron poison micro-particles have an average diameter of 10 nm to 1 μm.

17. The nuclear power generation system as set forth in claim 6, wherein the metal boride comprises $TiB_2$.

* * * * *